United States Patent
Jay

[15] 3,672,703
[45] June 27, 1972

[54] GIFT CHECK TRANSACTION FORM

[72] Inventor: Edward William Jay, P.O. Box 791, Coral Gables, Fla. 33134

[22] Filed: Nov. 16, 1970

[21] Appl. No.: 89,613

[52] U.S. Cl. ............................................. 282/25, 283/58
[51] Int. Cl. ................................. B41l 1/20, B42d 15/00
[58] Field of Search ................. 283/57, 58, 56; 282/25, 12, 282/11.5

[56] References Cited

UNITED STATES PATENTS

| | | | |
|---|---|---|---|
| 1,567,875 | 12/1925 | Swanson | 282/25 |
| 1,591,231 | 7/1926 | Otis | 282/25 |
| 3,111,336 | 11/1963 | Schumacher | 282/25 |
| 3,497,242 | 2/1970 | Seidman | 283/6 |

*Primary Examiner*—Lawrence Charles
*Attorney*—John Cyril Malloy

[57] ABSTRACT

A one-piece sheet paper form of elongate generally rectangular configuration, having fold-tear lines demarcating the form into a gift check section, an envelope section, a record section and an identifying section. The transaction form is adapted to be accordion folded in flat multi-thickness compact configuration for retail vending or the like. A vendor of the transaction form may fill out the amount only of a gift check blank imprinted on a fold panel of the gift check section, forming simultaneously a carbon copy on a check blank panel of the record section. The vendor may then separate the gift check section with the envelope section from record section, the latter of which he keeps. The vendee will then place the check section in the envelope section for mailing or delivery to a recipient, after filling in the remaining blanks and separating the check section from the envelope section. The recipient separates greeting area from check before cashing or depositing.

9 Claims, 6 Drawing Figures

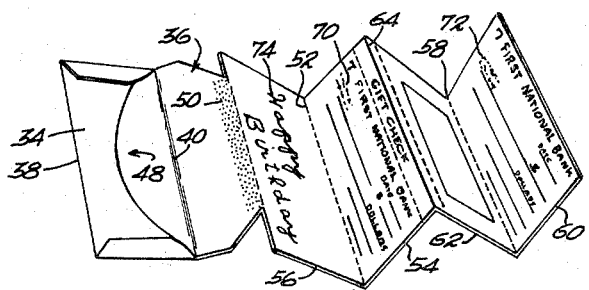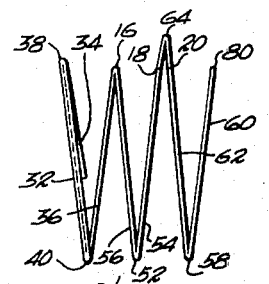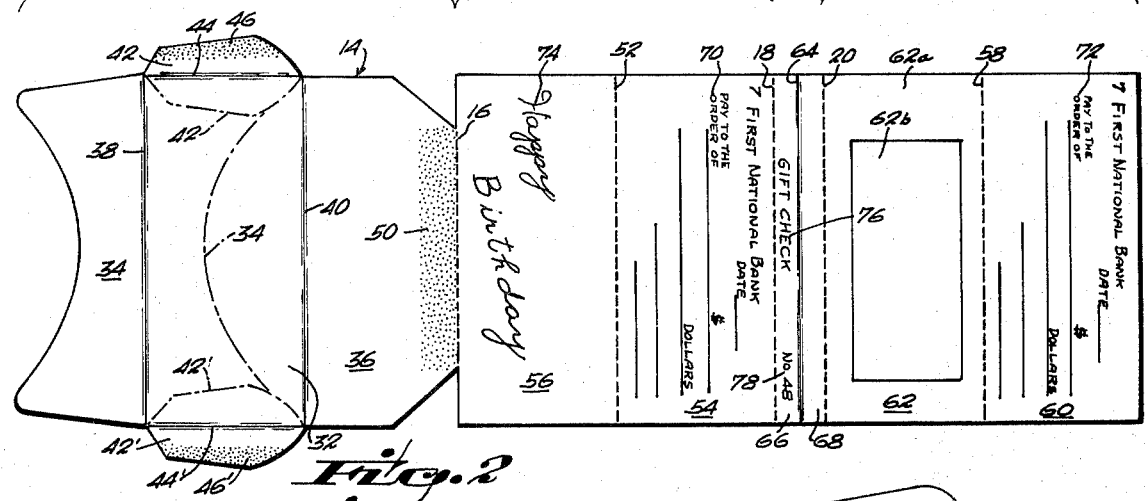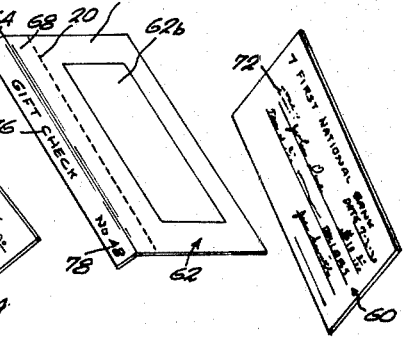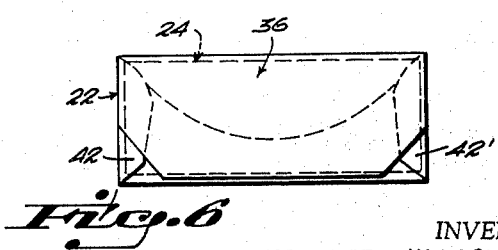
INVENTOR.
EDWARD WILLIAM JAY
BY John Cyril Malloy
ATTORNEY

GIFT CHECK TRANSACTION FORM

BACKGROUND OF THE INVENTION

1. Field of the Invention

The invention relates to printed matter generally and particularly to business or gift transaction forms having associated mailing envelope means.

2. Description of the Prior Art

In the past, various sheet paper folding form constructions have been devised for facilitating money transactions or the like through postal services. The typical transaction form utilizes banking services and is provided with a check blank, envelope means and a record sheet or the like. The purchaser of a check for a sum of money, fills in the remainder of the blank check portion of the transaction form, typically folds the form to provide envelope means and mails the check and envelope combination. U.S. Pat. Nos. 2,831,707; 2,835,512 and 3,497,242 each disclose transaction forms designed for facilitating convenient conveyance of money by mail, utilizing bank draft paper, banking services or the like. The prior art transaction forms typically are of complicated construction having separable parts which are easily lost or misplaced; the complicated construction may also require an appreciable degree of practice or dexterity in using the prior art transaction form. The envelope structure of the typical mailing type transaction form does not provide a full jacket enclosure for a bank check or the like; the check may form a part of the envelope and may include fold-over flap panels for forming the envelope structure. In using the transaction form of such construction, the envelope formation typically is destroyed when the bank check portion is removed. The prior art transaction form may also include multiple separable sheets or the like or be of generally complex configuration, necessitating expensive manufacture procedure and relatively high sales price.

SUMMARY OF THE INVENTION

The instant invention provides a transaction form of substantially simple design, of one-piece form, which does not include separable parts which may be lost or misplaced in handling. The transaction form of the invention is easy to use and affords a convenient efficient way for handling bank check transactions or the like through the postal services. The envelope structure of the transaction form provides a full jacket enclosure of conventional configuration for the gift check. The transaction form of the instant invention is adapted to be imprinted with different greetings, messages or designs for use on various holidays, celebrations or for various occasions. It is adapted to be accordian-folded into compact configuration and vended or distributed in a bank, chain store or the like. The gift check section, the envelope section and the record section of the form may be faced with corresponding design or illustration indicia providing pleasing appearance and ready means of identification of the several sections of a transaction form. The flat compact configuration of the folded form affords convenient packaging, shipment and storage of a multiplicity of the forms. The construction of the transaction form permits ready embossment by a typical check meter of a bank or the like; the folded form may be quickly and easily passed through a check meter, simultaneously embossing both the check section and record section with the amount of the check. The substantially simple design of the transaction form admits of economical manufacture and marketing.

BRIEF DESCRIPTION OF THE DRAWINGS

FIG. 1 is a perspective view of the gift check transaction form in a configuration suitable for vending, illustrating the form in a partially unfolded configuration;

FIG. 2 illustrates the transaction form in sheet blank configuration, with the envelope section thereof being unfolded.

FIG. 3 is an end view of the transaction form, taken as from FIG. 1, but illustrating the transaction form in substantially a collapsed configuration;

FIG. 4 demonstrates the use of the transaction form and the dividing of the transaction form into several parts;

FIG. 5 illustrates the gift check section of the transaction form partially inserted in the envelope section preparatory to mailing the check section; and FIG. 6 illustrates the check section fully enclosed in the envelope section, in a configuration for mailing.

DESCRIPTION OF THE PREFERRED EMBODIMENT

The gift check transaction form, indicated by numeral 12, preferably is in the form of a single construction sheet 14, preferably of letter paper weight. The construction sheet 14 is demarcated by a series of fold-tear score lines 16, 18, 20 into an envelope section 22, a gift check section 24, an identification section 26, and a record section 30. The sheet 14 may be divided into the several sections 22, 24, 26, 30 by severing respectively the sections along fold-tear score lines 16, 18 and 20.

The envelope section 22 includes a front panel 32, a back panel 34 and a cover panel 36 connected respectively by parallel fold lines 38 and 40. Flap portions 42, 42' connected respectively along fold lines 44, 44', convergingly fold flat against the back panel 34 in forming the envelope structure 22. Adhesive coatings 46, 46' form respectively on the obverse face surface of the envelope section 22 preferably provides means for laminatingly securing the flap portions 42, 42' on the opposite edge margins of the back panel 34. The broken line showings of the backpanel 34 and flap portions 42, 42' in FIG. 2 illustrate the envelope section folded, and forming an envelope pocket 48. An adhesive coating 50 may also be applied to the closure panel 36 for securing the envelope in closed configuration.

The gift check section 24 preferably includes a fold-tear line 52 demarcating the gift check section into an original check panel 54 and a face flap panel 56. The record section 30 preferably is of size and shape corresponding with the gift check section 24; the record section likewise includes a fold-tear line 58 demarcating the record section into a duplicate check panel 60 and writing transfer panel 62. The identifying section 26 preferably includes a fold line 64 extending transversely of the sheet 14 and equally demarcating the identification section into narrow rectangular portions 66 and 68. The check section 24 in association with the identification portion 66, and the record section 30 in association with the identification section 68, preferably are of corresponding configuration and symmetrically arranged relative to the fold line 64.

Blank check indicia 70 and 72 preferably is printed on the obverse side of the construction sheet 14, respectively on the obverse face surfaces of the original check panel 54 and duplicate check panel 60. Message or greeting or design indicia 74, suitable for a particular occasion, preferably is printed on the face panel 56 of the gift check section; the indicia 74 may be in the form of a Christmas or Birthday greeting, a congratulatory message, or holiday design or the like.

Identifying indicia 76 and 78 may also be applied to the portion 66 of the identifying section 26. The indicia 76 may show the trade name of the manufacturer or vendor of the gift check transaction form. The indicia 78 may be applied to the section 26 for identifying the particular occasion of use of the transaction form 12 or for determining the substance of the greeting indicia 74 without unfolding the transaction form and reading the indicia. The identifying indicia 78 is adapted to be used in correspondence with a separate list (not shown) listing in chronological order the several different transaction forms available and suitable for various occasions. For example, the number 48, shown on a separate listing, may indicate that a transaction form having identifying indicia number 48 will be a form for a birthday greeting. In this manner, a prospective purchaser of a transaction form may readily select a particular form from a variety of forms edgewise arranged in close order in a card rack or the like.

The gift check transaction form is adapted to be accordian-folded on the respective fold lines into a compact multiple thickness configuration for vending (see FIG. 3). The indicia 70, 72, 74, 76, 78 formed on the obverse surface of the construction sheet 14 preferably is correspondingly arranged so that all of the indicia may be read by a person viewing from the envelope section of the form or when the form is suspended by the record section 30. The form is adapted to be folded in accordian-fold configuration and edgewise supported on a rack or the like with the identification section 26 in conspicuous display. When in a folded configuration edgewise supported on a card rack or the like, the score lines 40, 52, 58 of the blank 14 will be in close juxtaposition and may rest on the rack structure. Conversely, the score lines 16, 18, 20 and the edge margin 80 of the form will be in close arrangement subjacently of the identification section 26. The several panels 32, 36, 54, 56, 60, 62 of the sheet 14 preferably are each of like rectangular configuration and define substantially the rectangular outline of the folded transaction form when in a configuration for vending.

The writing transfer panel 62 is arranged between the original check panel 54 and duplicate or carbon copy check panel 60; the transfer panel 62 in a preferred embodiment provides carbon paper means. The transfer panel 62 preferably includes a thin planar body 62a formed of the thin construction sheet material and a thin film 62b of carbon substance or the like formed on the obverse face of the thin planar body 62a. The blank check indicia 70 of the check panel 54 and the blank check indicia 72 of the check panel 60 are in register and the transfer panel 62 arranged interposedly when the panels 54, 60, 62 are in flatwise accordian-fold relation. A person writing a check on the original check panel 54 thus forms a duplicate record on the check panel 60. Likewise, the amount of a check may be embossed on the check panel 54 by a check meter, simultaneously forming a duplicate check amount embossment on the duplicate check panel.

A user of the gift check transaction form may use the form by carrying out the following procedure: With the transaction form in a partially unfolded configuration, but with the panels 54, 60, 62 in flatwise relation, the user fills out or completes the original check panel 54, forming simultaneously a duplicate copy on the check panel 60. The user may then separate the several parts of the transaction form respectively on the fold-tear lines 16, 18, 58, as illustrated in FIG. 4. The gift check section 24 may then be folded on the fold-tear line 52 and inserted in the envelope pocket 48. The cover 36 of the envelope may be folded over and sealed by the adhesive means 50 and the envelope posted. The duplicate check panel 60 may be given to and be retained by the purchaser for a record of the transaction or optionally retained by the vendor and the identification section 26 and panel 62 discarded as waste. In certain uses of the transaction form, as for example in bank distribution, it may be desirable to retain also the identification section 26 of each transaction form used or processed. In such instances, the identification section 26 may be severed from the writing transfer panel 62 and retained for inventory purposes or the like.

In certain applications of the invention, it may be desirable to modify the transaction form structure from that above described. For example, the writing transfer panel 62 may be modified to include a sheet of carbon paper secured or framed within a rectangular opening formed in the check panel structure. Also, the construction of the envelope section 22 may vary substantially from that shown; the particular flap configuration or fold arrangement for the envelope section may be somewhat different from the embodiment above described. Also in certain applications of the invention, it may be desirable to construct a transaction form without the identification section 26. In such an embodiment, a single fold-tear line replaces the dual tear-lines 18, 20 and the original check panel 54 the writing transfer panel 62 are directly joined along such a fold-tear line. In such a modification, an identification section or tab may be formed on another part of the construction sheet 14 or identifying indicia may be formed directly on a selected panel of the transaction form. The opposite face surfaces of the several sections of the transaction form preferably are provided with bright colored designs or appropriate color ornamentation for aesthetic appeal or attractive display.

While the instant invention is shown and described in a presently preferred embodiment, the disclosure is by way of example, and various changes and modification may be made in the embodiment shown without departing from the spirit of the invention.

I claim:

1. A gift check transaction form including a construction sheet having a series of score lines demarcating said sheet into a gift check section on one side of the gift check section, an envelope section on the other said of said gift check section and a record section, said gift check section including an original check panel having blank check indicia formed thereon, and a face flap panel connected on a fold-tear score line to said original check panel; said record section including a duplicate check panel having blank check indicia formed thereon and writing transfer panel means connected on a fold-tear score line to said duplicate check panel, and including indicia formed on said gift check section, imparting a greeting or the like to a recipient of the check section; said gift check transaction form being adapted to be folded at the respective score lines to compact multiple thickness configuration for marketing.

2. A gift check transaction form as set forth in claim 1 wherein said envelope section includes a back panel, a front panel, and a closure panel, connected together in that order respectively on fold score lines extending transversely of said construction sheet and wherein said closure panel is connected on a fold-tear score line to the fact flap panel of said gift check section.

3. A gift check transaction form as set forth in claim 2 wherein said envelope section includes oppositely arranged flap portions convergingly foldable on fold lines extending transversely of said front panel and adhesive means securing said flap portions to said back panel forming an envelope enclosure for receiving said check section.

4. A gift check transaction form as set forth in claim 3 wherein the blank check indicia respectively of said check section and record section, and the greeting indicia of said check section is formed on the same side of said construction sheet.

5. A gift check transaction form as set forth in claim 1 including an identifying section connected between said gift section and said record section and having indicia formed thereon identifying the greeting indicia formed on the check section.

6. A gift check transaction form as set forth in claim 5 wherein said identifying section is substantially integrally connected with said writing transfer panel means, extending substantially the full lateral extension thereof and connected with said gift check section on a fold-tear line.

7. A gift check transaction form as set forth in claim 6 wherein said identifying section is provided with a transversely extending fold line arranged medially of said writing transfer panel means and said original check panel.

8. A gift check transaction form as set forth in claim 7 wherein said writing transfer panel means includes a planar body of substantially thin paper or the like, of thickness permitting ready deformation with the point of a writing instrument, and having a duplicating means responsive to deformation to transfer an image on that side of said planar body corresponding with that side of said construction sheet bearing the blank check indicia of said check section and record section; accordianfolding said original check panel, said writing transfer panel means and said duplicate check panel affording carbon copy development of said duplicate check panel when writing on said original check panel.

9. A gift check transaction form as set forth in claim 8 wherein said construction sheet is of unitary one-piece sheet paper blank configuration.

* * * * *